US012798362B2

(12) United States Patent
Kanemoto et al.

(10) Patent No.: US 12,798,362 B2

(45) Date of Patent: Nov. 17, 2026

(54) GRILLE SHUTTER DEVICE

(71) Applicant: TOYODA GOSEI CO., LTD., Kiyosu (JP)

(72) Inventors: Yasuhiro Kanemoto, Kiyosu (JP); Tendo Ishikawa, Kiyosu (JP); Yuhki Maji, Kiyosu (JP); Shunsuke Aoyama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 159 days.

(21) Appl. No.: 18/987,393

(22) Filed: Dec. 19, 2024

(65) Prior Publication Data

US 2025/0242685 A1 Jul. 31, 2025

(30) Foreign Application Priority Data

Jan. 30, 2024 (JP) ................................. 2024-011875
Sep. 9, 2024 (JP) ................................. 2024-155093

(51) Int. Cl.
*B60K 11/08* (2006.01)

(52) U.S. Cl.
CPC ................................. *B60K 11/085* (2013.01)

(58) Field of Classification Search
CPC .................................................... B60K 11/085
See application file for complete search history.

(56) References Cited

U.S. PATENT DOCUMENTS 4,753,288 A * 6/1988 Harvey ..................... F01P 7/10 123/41.58
10,071,625 B1 * 9/2018 Stoddard ............. B60K 11/085
2011/0070817 A1 * 3/2011 Walters ..................... F01P 7/10 454/155
2013/0068403 A1 * 3/2013 Fenchak ............. B60K 11/085 160/218
2014/0090610 A1 * 4/2014 Higuchi ............... B60K 11/085 123/41.58
2017/0291485 A1 10/2017 Yasui
2019/0210451 A1 * 7/2019 Parra .................... B60K 11/085
2019/0241062 A1 8/2019 Shimizu
2023/0391184 A1 * 12/2023 König .................. B60K 11/085
2024/0208398 A1 * 6/2024 Raghavan ............ B60K 11/085
2025/0196618 A1 * 6/2025 Yoon ..................... F21S 43/601

FOREIGN PATENT DOCUMENTS

| | | | |
|---|---|---|---|
| CN | 219706677 | U | 9/2023 |
| JP | 6155249 | B2 | 6/2017 |
| JP | 2019131139 | A | 8/2019 |
| WO | 2019/082556 | A1 | 5/2019 |

* cited by examiner

*Primary Examiner* — Timothy Hannon

(74) *Attorney, Agent, or Firm* — Posz Law Group, PLC

(57) ABSTRACT

A grille shutter device includes a frame body having an inlet. The frame body defines a design surface at a front section of a vehicle. The grille shutter device also includes flaps that are configured to open or close the inlet by rotating in forward and reverse directions around respective rotary shafts. A front surface of a part of the frame body that surrounds the inlet extends in a direction intersecting a vehicle width direction such that the front surface extends rearward as the front surface extends outward in the vehicle width direction. When the flaps are located in closed position to close the inlet, the flaps are arranged such that front surfaces of the flaps are arranged along the front surface of the frame body.

3 Claims, 5 Drawing Sheets

GRILLE SHUTTER DEVICE

CROSS-REFERENCE TO RELATED APPLICATIONS

This application is based upon and claims the benefit of priorities from prior Japanese Patent Application No. 2024-011875, filed on Jan. 30, 2024, and prior Japanese Patent Application No. 2024-155093, filed on Sep. 9, 2024, the entire contents of each of which are incorporated herein by reference.

BACKGROUND

1. Field

The present disclosure relates to a grille shutter device.

2. Description of Related Art

International Publication No. 2019/082556 discloses a grille shutter device configured to open or close a grille opening provided at the front section of a vehicle. The grille shutter device includes blades, each having a rotary shaft extending in an up-down direction. The blades are arranged in the grille opening at intervals along the same axis that extends in the vehicle width direction. The blades open or close the grille opening by rotating in forward and reverse directions around the rotary shafts.

The front section of the vehicle may include, for example, a design surface that extends in a direction intersecting the vehicle width direction such that the design surface extends rearward from the vehicle as it extends outward in the vehicle width direction. When the grille shutter device described in the above publication is installed on the front section of the vehicle with such a design surface, the blades of the grille shutter are arranged along the same axis extending in the vehicle width direction, while the design surface at the front section of the vehicle extends in the direction intersecting the vehicle width direction. In this case, the plane direction of the front surfaces of the blades in the closed state of the grille opening is less aligned with the plane direction of the design surface. As a result, the aesthetic appeal of the grille shutter device, and consequently the vehicle, may be lowered.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A grille shutter device according to an aspect of the present disclosure is configured to open or close an opening provided on a vehicle. A front side and a rear side in a front-rear direction of the vehicle are respectively referred to as a front side and a rear side. The grille shutter device includes a frame body having an inlet through which air flows. The frame body defines a design surface at a front section of the vehicle. The grille shutter device also includes flaps each having a rotary shaft, the rotary shaft extending in an up-down direction and being rotationally supported by the frame body. The flaps are configured to open or close the inlet by rotating in forward and reverse directions around the respective rotary shafts. A front surface of a part of the frame body that surrounds the inlet extends in a direction intersecting a vehicle width direction such that the front surface extends rearward as the front surface extends outward in the vehicle width direction. When the flaps are located in closed position to close the inlet, the flaps are arranged such that front surfaces of the flaps are arranged along the front surface of the frame body.

Other features and aspects will be apparent from the following detailed description, the drawings, and the claims.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, “at least one of A and B” should be understood to mean “only A, only B, or both A and B.”

First Embodiment

A grille shutter device 10 according to a first embodiment will now be described with reference to FIGS. 1 to 6. In this specification, the term “along” is not limited to cases where the target direction is exactly parallel to the reference direction, but also includes cases where the target direction is generally along the reference direction within the scope that achieves the operation and advantages of the present embodiment.

Hereinafter, the front side and the rear side in the front-rear direction of a vehicle 100, shown in FIG. 1, will be referred to as “front” and “rear,” respectively. Further, the right side and the left side in a vehicle width direction during the forward movement of the vehicle 100 will be referred to as “right” and “left,” respectively. Furthermore, the upper side and the lower side in the up-down direction of the vehicle 100 will be referred to as "upper" and "lower," respectively.

Grille Shutter Device 10

Figure 1:
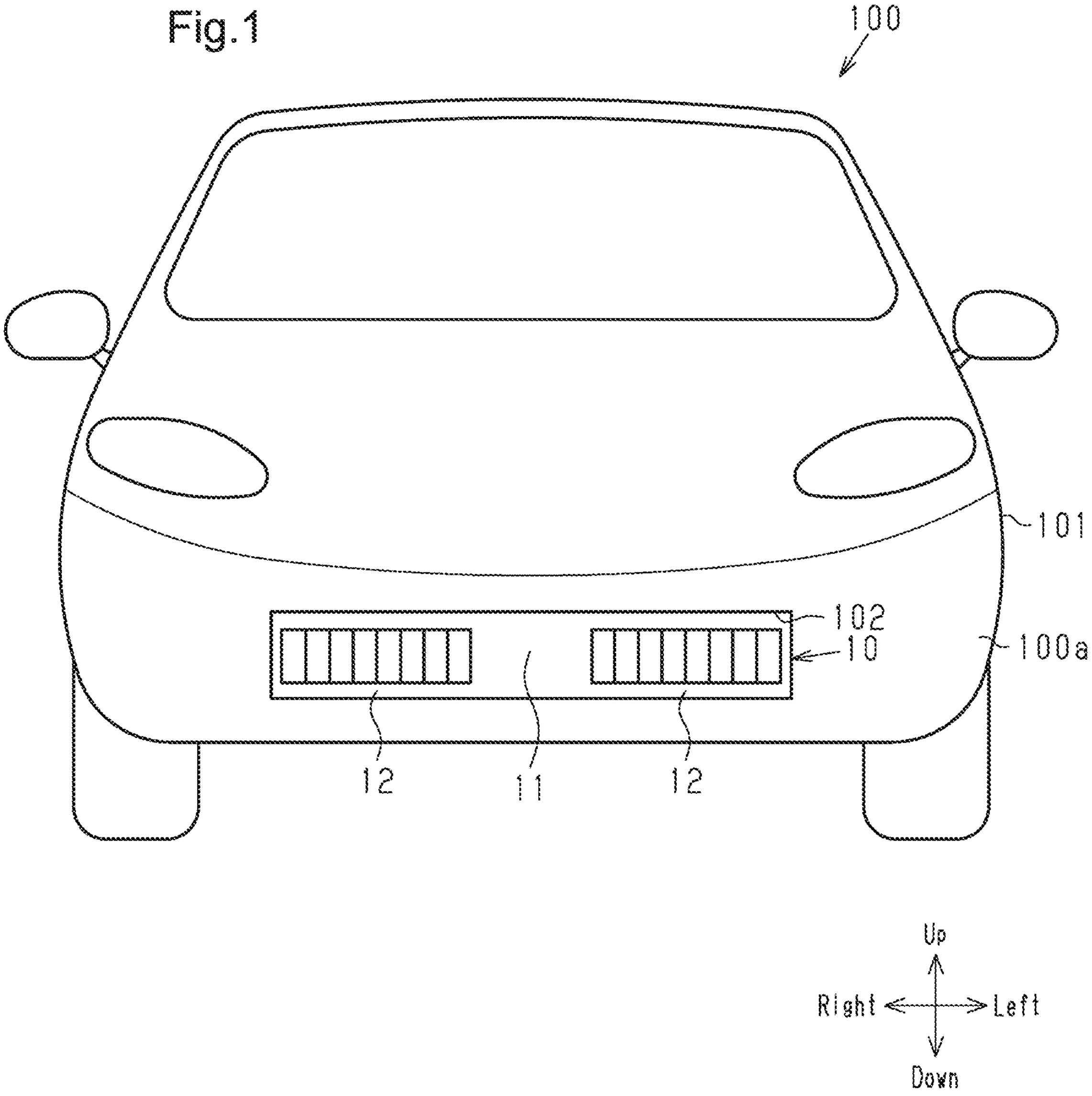
FIG. 1 is a front view of a vehicle including a grille shutter device according to a first embodiment.

As shown in FIG. 1, the grille shutter device 10 is mounted in an opening 102 that is provided at a front section of the body 101 of the vehicle 100. The grille shutter device 10 allows or blocks the inflow of air into the body 101 through the opening 102 by opening or closing the opening 102. A radiator (not shown), for example, is located behind the opening 102 on the inner side of the body 101.

The front section of the vehicle 100 includes a design surface 100*a* that curves rearward as it extends outward from the center in the vehicle width direction. The grille shutter device 10 is part of the design surface 100*a*. The grille shutter device 10 extends along the design surface 100*a*, curving rearward as it extends outward from the center in the vehicle width direction.

The grille shutter device 10 includes a cover 11, and two shutters 12 respectively located on the opposite sides of the cover 11 in the vehicle width direction. The rear surface of the cover 11 is equipped with a device, such as a millimeter wave radar (not shown). The two shutters 12 have a symmetrical shape in the vehicle width direction.

Hereinafter, the components of the left one of the two shutters 12 will be described, and thus those of the right shutter 12 will not be described.

Figure 2:
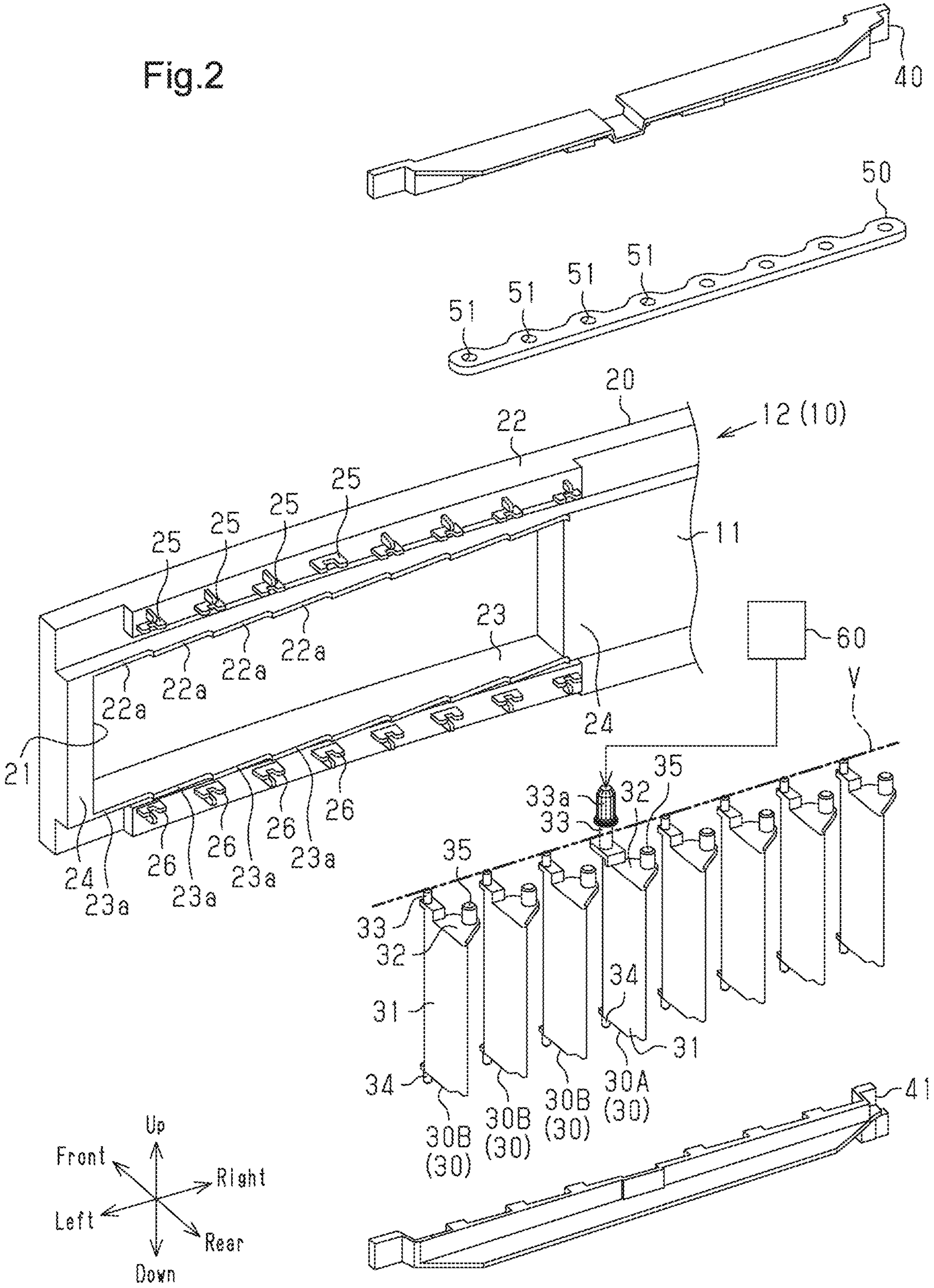
FIG. 2 is an exploded perspective view of the grille shutter device shown in FIG. 1.

As shown in FIG. 2, the shutter 12 includes a frame body 20, flaps 30, an upper retainer 40, a lower retainer 41, a link 50, and an actuator 60. The frame body 20, each flap 30, the upper retainer 40, the lower retainer 41, and the link 50 are formed from resin material.

The frame body 20 is attached to the opening 102 (see FIG. 1) of the body 101. The flaps 30 are rotationally supported by the frame body 20. The upper retainer 40 and the lower retainer 41 restrict detachment of the flaps 30 supported by the frame body 20. The link 50 couples the flaps 30 to each other, thereby coordinating the rotation of the flaps 30 relative to the frame body 20. The actuator 60 rotates the flaps 30.

Each component of the shutter 12 will now be described in detail.

Frame Body 20

The frame body 20 includes an inlet 21 into which air flows. The inlet 21 extends through the frame body 20 in the front-rear direction. The inlet 21 has a substantially rectangular shape elongated in the vehicle width direction.

The frame body 20 includes an upper frame portion 22 that defines the upper edge of the inlet 21, a lower frame portion 23 that defines the lower edge of the inlet 21, and two vertical frame portions 24 that respectively define the opposite side edges of the inlet 21. The two vertical frame portions 24 connect the ends of the upper frame portion 22 and the ends of the lower frame portion 23 to each other.

The front surface of a part of the frame body 20 that surrounds the inlet 21 (i.e., the front surface of each of the upper frame portion 22, the lower frame portion 23, and the two vertical frame portions 24) extends rearward in a direction intersecting the vehicle width direction as it extends outward from the cover 11 in the vehicle width direction. Specifically, the front surface of the frame body 20 extends in a curve, located progressively farther to the rear toward the outer portion in the vehicle width direction.

The upper frame portion 22 includes upper supports 25 that rotationally support upper rotary shafts 33 of the flaps 30, which will be described later, respectively. The upper supports 25 are spaced apart from each other in the longitudinal direction of the inlet 21. Each upper support 25 protrudes rearward from the rear surface of the upper frame portion 22. Each upper support 25 has a recess that opens rearward and rotationally accommodates a corresponding upper rotary shaft 33. The recess of each upper support 25 accommodates the upper rotary shaft 33 through the rear opening.

The lower frame portion 23 includes lower supports 26 that rotationally lower support rotary shafts 34 of the flaps 30, which will be described later, respectively. The lower supports 26 are spaced apart from each other in the longitudinal direction of the inlet 21. The lower supports 26 are located in correspondence with the upper supports 25. Each lower support 26 protrudes rearward from the rear surface of the lower frame portion 23. Each lower support 26 has a recess that opens rearward and rotationally accommodates a corresponding lower rotary shaft 34. The recess of each lower support 26 accommodates the lower rotary shaft 34 through the rear opening.

The part of the rear surface of the upper frame portion 22 that defines the upper edge of the inlet 21 includes upper notches 22*a*. The upper notches 22*a* are spaced apart from each other in the longitudinal direction of the inlet 21. The upper notches 22*a* are formed such that those located farther outward in the vehicle width direction are located farther rearward. Each upper notch 22*a* is shaped in conformance with the front surface of a corresponding flap 30 in the closed position, which will be described later.

The part of the rear surface of the lower frame portion 23 that defines the lower edge of the inlet 21 includes lower notches 23*a*. The lower notches 23*a* are spaced apart from each other in the longitudinal direction of the inlet 21. The lower notches 23*a* are formed such that those located farther outward in the vehicle width direction are located farther rearward. The lower notches 23*a* are located in correspondence with the upper notches 22*a*. Each lower notch 23*a* is shaped in conformance with the front surface of a corresponding flap 30 in the closed position, which will be described later.

Flap 30

The flaps 30 are arranged in the longitudinal direction of the inlet 21. The flaps 30 include one driving flap 30A and driven flaps 30B. The shutter 12 includes, for example, seven driven flaps 30B. The driving flap 30A is located, for example, between three driven flaps 30B arranged in parallel and four driven flaps 30B arranged in parallel.

Each flap 30 includes a body 31, the upper rotary shaft 33, the lower rotary shaft 34, and a support shaft 35. The body 31, the upper rotary shaft 33, the lower rotary shaft 34, and the support shaft 35 are integrally formed in a seamless, continuous manner. The bodies 31 of the flaps 30 are identical in shape. The upper rotary shaft 33 of the driven flap 30B and the upper rotary shaft 33 of the driving flap 30A each have a different shape. The upper rotary shaft 33 and the lower rotary shaft 34 are each an example of a rotary shaft.

The body 31 has a rectangular plate shape with long sides extending in the up-down direction and short sides extending in a direction that is orthogonal to the long sides. The upper end of the body 31 has a projecting piece 32 that extends toward one side in the thickness direction of the body 31.

The upper rotary shaft 33 projects upward from the upper end of the body 31. The upper rotary shaft 33 is located at one end of the body 31 in the lateral direction. The lower rotary shaft 34 protrudes downward from the lower end of the body 31. The lower rotary shaft 34 is located at the one end of the body 31 in the lateral direction. The upper rotary shaft 33 and the lower rotary shaft 34 are located on the same axis, which extends in the up-down direction. The upper rotary shaft 33 and the lower rotary shaft 34 are rotationally supported by the upper support 25 and the lower support 26, respectively.

The flaps 30 are arranged on an imaginary axis V that extends straight such that those located farther outward in the vehicle width direction are located farther rearward. Specifically, the upper rotary shafts 33 and the lower rotary shafts 34 are arranged on the imaginary axis V. The flaps 30 are arranged at equal intervals along the imaginary axis V.

The tip of the upper rotary shaft 33 of the driving flap 30A has a gear 33*a* with teeth.

The support shaft 35 projects upward from a projecting end of the projecting piece 32 of the body 31. The support shaft 35 is located rearward from the upper rotary shaft 33.

Figure 3:
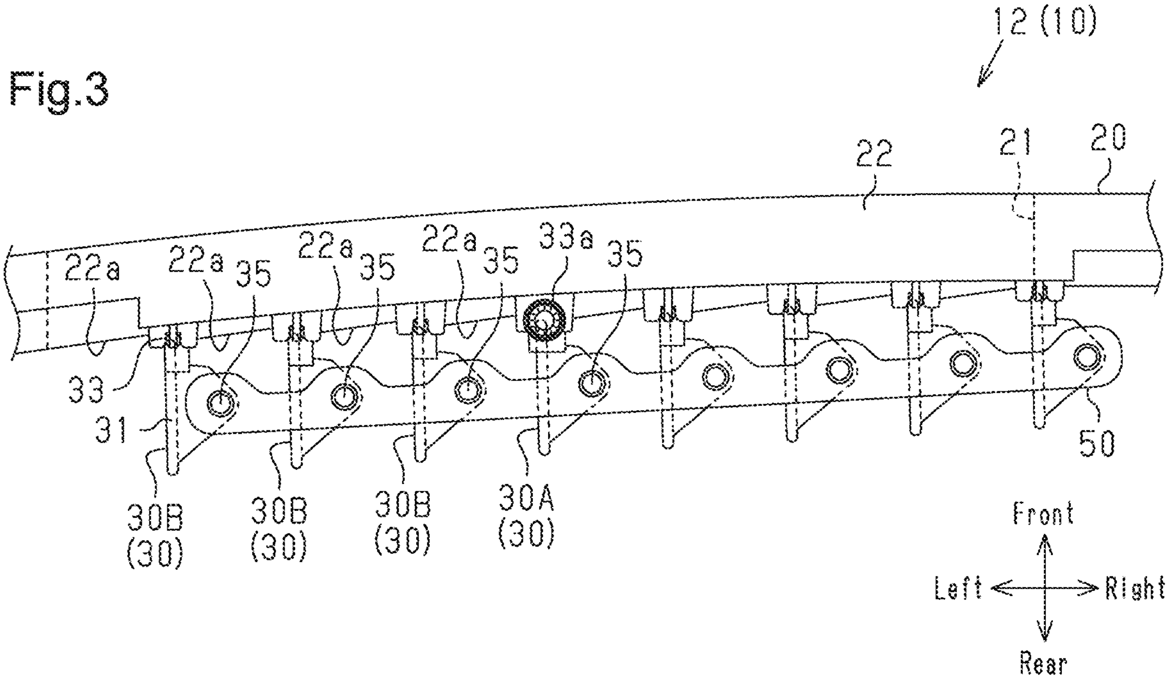
FIG. 3 is a plan view of the grille shutter device when the flaps are in the open position.
Figure 4:
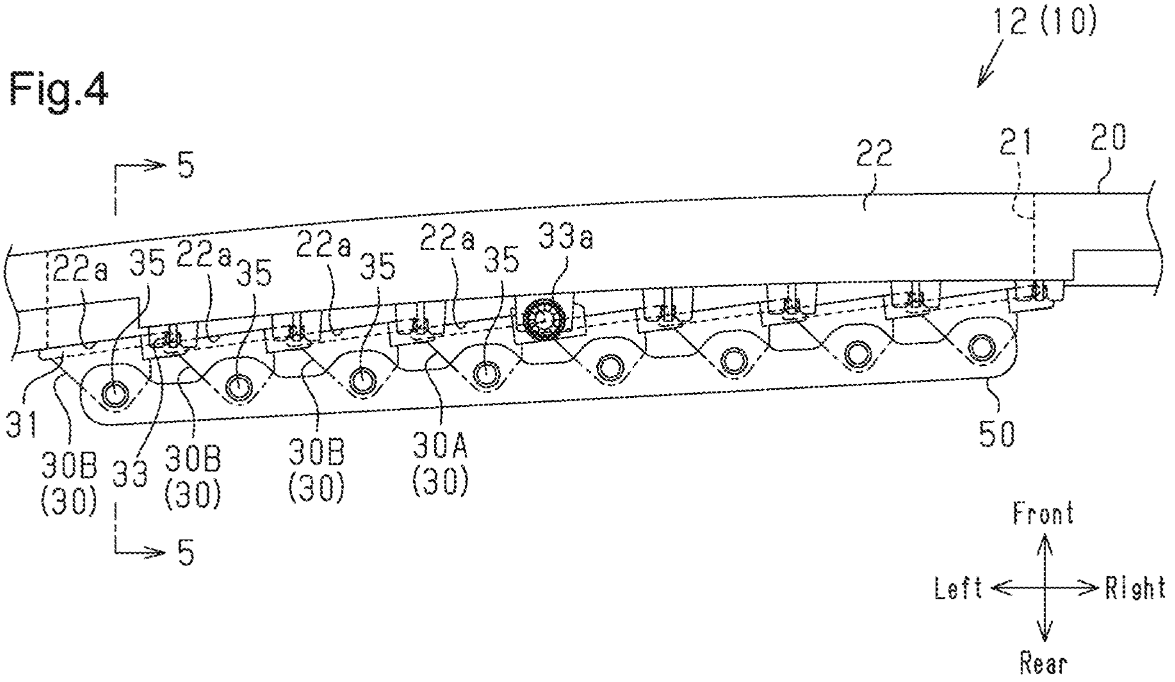
FIG. 4 is a plan view of the grille shutter device when the flaps are in the closed position.

As shown in FIGS. 3 and 4, the flaps 30 open and close the inlet 21 by rotating around the respective upper rotary shafts 33 and the respective lower rotary shafts 34 between an open position, at which the inlet 21 is open, and a closed position, at which the inlet 21 is closed. In FIGS. 3 and 4, the upper retainer 40 and the lower retainer 41 are not shown.

As shown in FIG. 3, when the flaps 30 are in the open position, the lateral direction of the body 31 of each flap 30 coincides with the longitudinal direction of the vehicle 100.

As shown in FIG. 4, when the flaps 30 are in the closed position, the lateral direction of the body 31 of each flap 30 is inclined with respect to the vehicle width direction such that the body 31 is located farther rearward from the one end, where the upper rotary shaft 33 and the lower rotary shaft 34 are provided, toward the other end.

Figure 6:
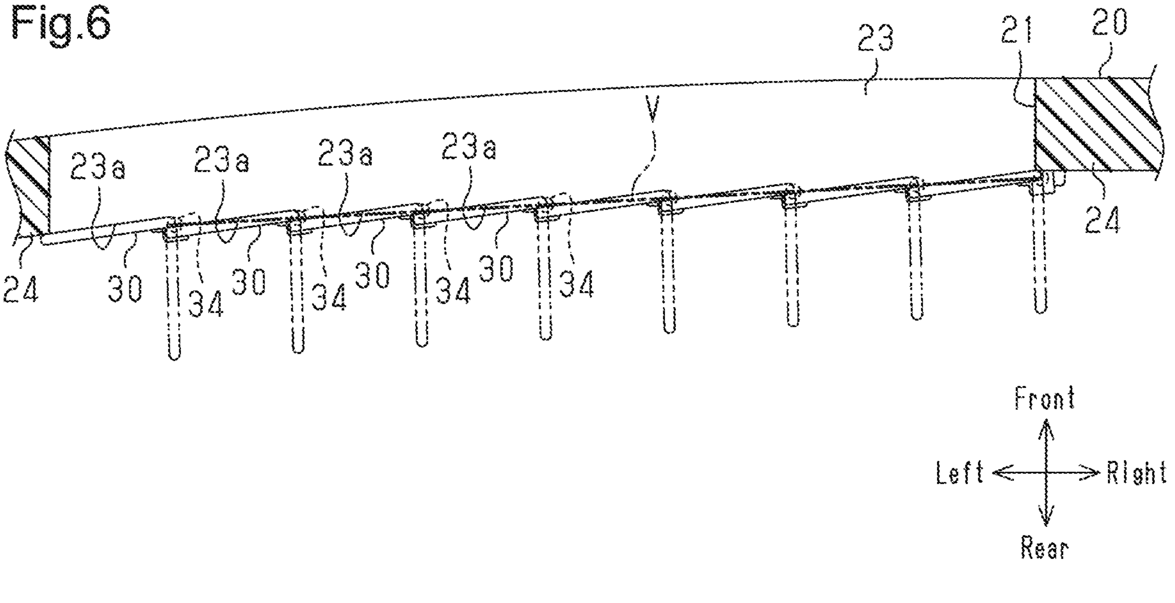
FIG. 6 is a cross-sectional view taken along line 6-6 in FIG. 5.

As shown in FIG. 6, the flaps 30 located in the closed position, are arranged such that the front surfaces of the flaps 30 exposed from the inlet 21 are arranged along the front surfaces of the upper frame portion 22 and the lower frame portion 23. When the flaps 30 are located in the closed position, the end of one body 31 on one side in the lateral direction, where the upper rotary shaft 33 and lower rotary shaft 34 are provided, overlaps the opposite end of another body 31 on the other side from behind. In this state, one end of the body 31 of the flap 30, which is located in the innermost position in the vehicle width direction, overlaps the vertical frame portion 24, which is located on the inner side in the vehicle width direction, from behind. The other end of the body 31 of the flap 30, which is located in the outermost position in the vehicle width direction, overlaps the vertical frame portion 24, which is located on the outer side in the vehicle width direction, from behind.

Figure 5:
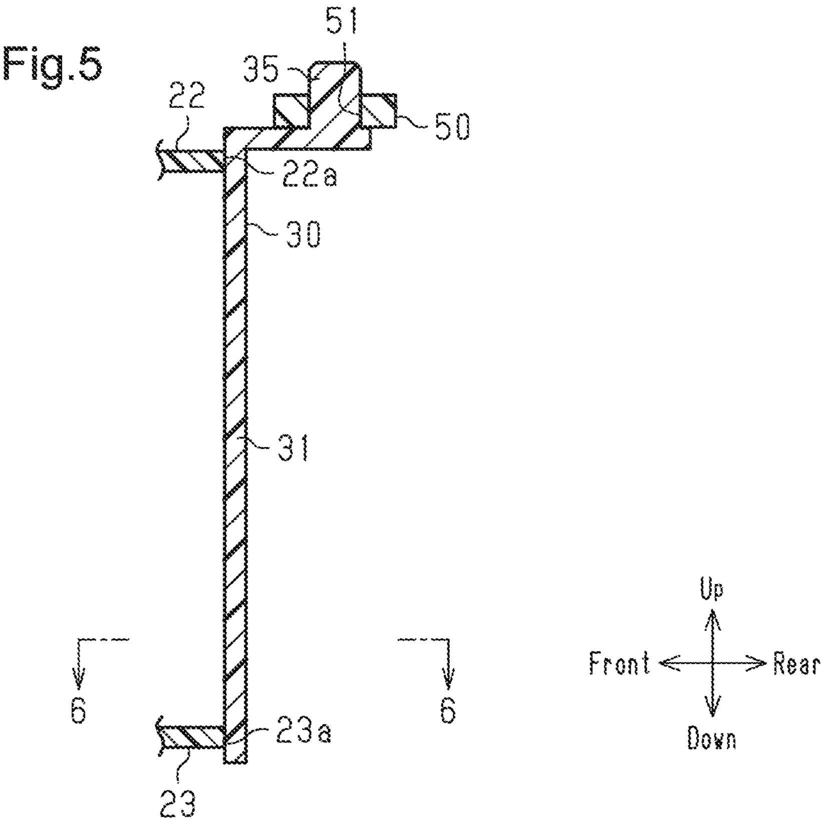
FIG. 5 is a cross-sectional view taken along line 5-5 of FIG. 4.

As shown in FIG. 5, the front surface of the body 31 of each flap 30 in the closed position is in contact with the rear surface of the upper frame portion 22 and the lower frame portion 23. Specifically, as shown in FIGS. 4 and 6, the front surface of the body 31 of each flap 30 in the closed position is in contact with the inner surface of the upper notch 22*a* and the inner surface of the lower notch 23*a* across substantially the entire body 31 in the lateral direction.

Upper Retainer 40 and Lower Retainer 41

As shown in FIG. 2, the upper retainer 40 and the lower retainer 41 have an elongated shape extending in the longitudinal direction of the inlet 21.

The upper retainer 40 is attached to the upper frame portion 22 so as to cover the recesses of all the upper supports 25 from behind. This restricts detachment of the upper rotary shafts 33, which are respectively accommodated in the recesses of the upper supports 25.

The lower retainer 41 is attached to the lower frame portion 23 so as to cover the recesses of all the lower supports 26 from behind. This restricts detachment of the lower rotary shafts 34, which are respectively accommodated in the recesses of the lower supports 26.

Link 50

The link 50 has an elongated plate shape extending in the longitudinal direction of the inlet 21. The link 50 includes support holes 51 that rotationally support the support shafts 35 of the flaps 30, respectively. The support holes 51 are spaced apart from each other in the longitudinal direction of the link 50. The support holes 51 are arranged along the above-described imaginary axis V. The support hole 51 is an example of a support.

The link 50 transmits power, acting on the driving flap 30A through the actuator 60, to each driven flap 30B. As a result, as the driving flap 30A rotates, each driven flap 30B rotates.

Actuator 60

The actuator 60 is, for example, a motor with an output shaft that is configured to rotate in forward and reverse directions.

The actuator 60 is mounted on, for example, the upper retainer 40. The output shaft of the actuator 60 is connected to the gear 33*a* of the driving flap 30A. The power of the actuator 60 is transmitted to the driving flap 30A through the gear 33*a*, causing the driving flap 30A to rotate in the forward and reverse directions.

Operation of Present Embodiment

The front surface of the frame body 20, which defines the design surface 100*a* of the vehicle 100, extends in a curve, located progressively farther to the rear toward the outer portion in the vehicle width direction. The flaps 30 located in the closed position are arranged such that those front surfaces are arranged along the front surface of the frame body 20. As a result, the plane direction of the flaps 30 located in the closed position extends along the design surface 100*a* of the vehicle 100.

Advantages of Present Embodiment (1-1) The front surfaces of the upper frame portion 22 and the lower frame portion 23 extend in a curve, located progressively farther to the rear toward the outer portion in the vehicle width direction. The flaps 30 located in the closed position are arranged such that those front surfaces are arranged along the front surfaces of the upper frame portion 22 and the lower frame portion 23.

This configuration produces the above-described operation and limits a decrease in the aesthetic appeal of the grille shutter device 10.

(1-2) The upper rotary shafts 33 and the lower rotary shafts 34 of the flaps 30 are arranged on the imaginary axis V, which extends straight such that those located farther outward in the vehicle width direction are located farther rearward. The support holes 51 are arranged along the imaginary axis V.

In this configuration, the support holes 51 are arranged along the imaginary axis V, where the upper rotary shafts 33 and the lower rotary shafts 34 of the flaps 30 are arranged linearly. Thus, for example, the need to provide joints in the link 50 to coordinate the flaps 30 is eliminated. This prevents the configuration of the link 50, and consequently the grille shutter device 10, from becoming more complex.

(1-3) The front surfaces of the flaps 30 in the closed position are in contact with the inner surfaces of the upper notches 22*a* and the lower notches 23*a*, respectively.

In this configuration, the contact between the flaps 30 in the closed position and the inner surfaces of the upper notches 22*a* and the lower notches 23*a* makes the gaps between the flaps 30 and the frame body 20 less visible from the front side. This limits a decrease in the aesthetic appeal of the grille shutter device 10.

(1-4) The bodies 31 of the flaps 30 each have the same shape. Thus, for example, if the length of the inlet 21 in the vehicle width direction varies by vehicle model, the need to prepare a different type of flaps 30 for each model is eliminated by adjusting the number of flaps 30. This allows the flaps 30 to be shared by different types of grille shutter devices employed in vehicle models with different lengths of the inlet 21 in the vehicle width direction. Further, there may be a case in which the length of the inlet 21 in the up-down direction varies by vehicle model. Even in this case, the need to prepare a different type of the upper retainer 40, the lower retainer 41, and the link 50 for each model is eliminated by preparing the flaps 30, each having a different length in the up-down direction. This allows the upper retainer 40, the lower retainer 41, and the link 50 to be shared by different types of grille shutter devices employed in vehicle models, each having a different length of the inlet 21 in the up-down direction.

Second Embodiment

A grille shutter device 210 according to a second embodiment will now be described with reference to FIGS. 7 and 8, focusing on the differences from the first embodiment.

In the second embodiment, same reference characters are given to those elements that are the same as the elements of the first embodiment. Such elements will not be described in detail. Further, reference numerals 2, which are obtained by adding 200 to the reference numerals  in the first embodiment, are given to components that correspond to the components in the first embodiment, and redundant explanations are omitted.

Figure 7:
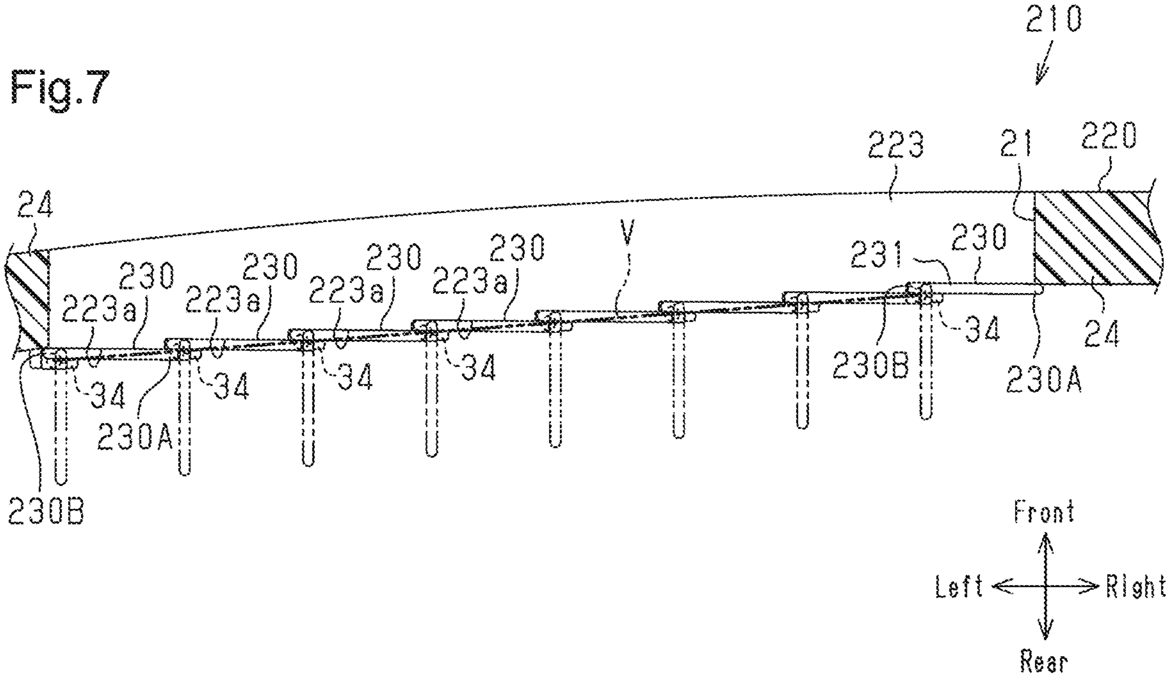
FIG. 7 is a cross-sectional view corresponding to FIG. 6 of the grille shutter device according to a second embodiment.

As shown in FIG. 7, in the grille shutter device 210 of the second embodiment, the arrangement of the flaps 230 differs from that in the first embodiment.

The body 231 of each flap 230 located in the closed position includes an edge on the inner side and an edge on the outer side in the vehicle width direction. Hereinafter, these edges are referred to as the inner end 230A and the outer end 230B, respectively. The outer end 230B is located on the opposite side of the inner end 230A in the flap 230.

The outer end 230B includes the upper rotary shaft 33 (see FIG. 2) and the lower rotary shaft 34.

The flaps 230 located in the closed position are arranged such that those front surfaces are arranged along the front surface of the frame body 220.

Figure 8:
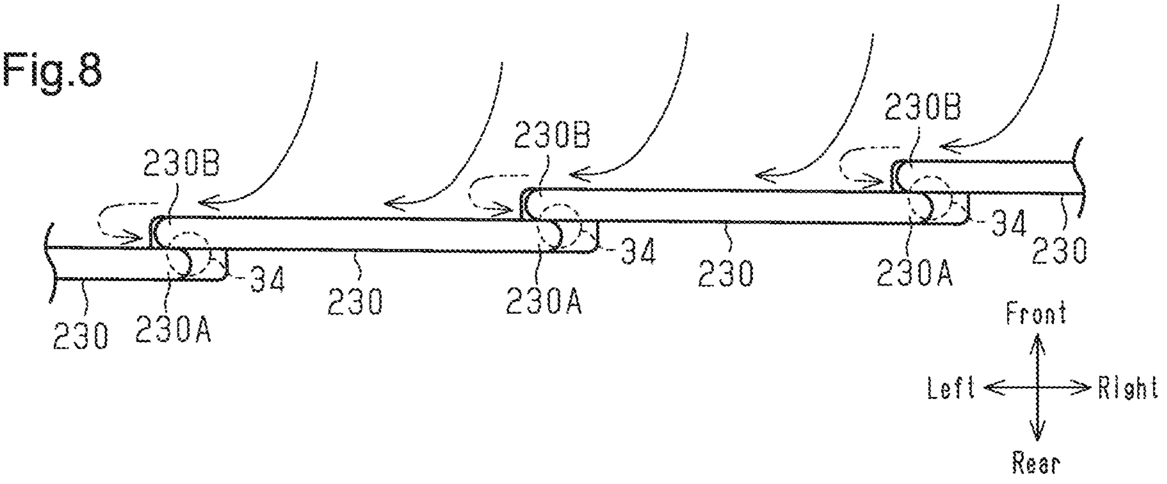
FIG. 8 is an enlarged view of the flap shown in FIG. 7.

As shown in FIG. 8, the outer end 230B of one flap 230 in the closed position overlaps, from the front, the inner end 230A of another flap 230 that is adjacent to that flap 230 on the outer side in the vehicle width direction. In the present embodiment, the outer end 230B of one flap 230 is in contact with, in the front-rear direction, the inner end 230A of another flap 230 that is adjacent to the one flap 230 on the outer side in the vehicle width direction.

As shown in FIG. 7, the inner end 230A of the flap 230 located on the innermost side in the vehicle width direction is in contact with the vertical frame portion 24 located on the inner side in the vehicle width direction from behind. The outer end 230B of the flap 230 located on the outermost side in the vehicle width direction is in contact with the vertical frame portion 24 located on the outer side in the vehicle width direction from behind.

Each flap 230 rotates such that the inner end 230A moves rearward, thereby moving the flap 230 from the closed position, shown by the solid line in FIG. 7, to the open position, shown by the long dashed double-short dashed line. Thus, when the flap 230 is in the open position, the body 231 of the flap 230 is located behind the inlet 21.

The front surface of the body 231 of each flap 230 in the closed position is in contact with the rear surface of a lower frame portion 223 and the frame body 220. Specifically, the front surface of the body 231 of each flap 230 in the closed position is in contact with the inner surface of a lower notch 223*a* across substantially the entire body 231 in the lateral direction. In the same manner as the first embodiment, the front surface of the body 231 of each flap 230 in the closed position is in contact with the inner surface of an upper notch (not shown), which is provided on the upper frame portion of the frame body 220, across substantially the entire body 231 in the lateral direction.

Operation of Present Embodiment

The front surfaces of the flaps 230 located in the closed position are arranged along the front surface of the frame body 220. Thus, as indicated by the solid arrows in FIG. 8, the air that is blown against the front surfaces of the flaps 230 during the traveling of the vehicle 100 more easily flows outward in the vehicle width direction along the front surfaces of the flaps 230. In the grille shutter device 210 of the present embodiment, the outer end 230B of one flap 230 in the closed position overlaps, from the front side, the inner end 230A of another flap 230 that is adjacent to the one flap 230 on the outer side in the vehicle width direction. This limits situations in which the air flowing outward in the vehicle width direction along the front surface of each flap 230 passes through the outer end 230B, and then, as shown by the arrows of the long dashed double-short dashed lines in FIG. 8, the air flows to the rear of the outer end 230B to enter the space between two flaps 230 overlapping each other in the front-rear direction. Accordingly, it is relatively difficult for the air flowing along the front surfaces of the flaps 230 to flow to the rear of the flaps 230 located in the closed position.

Advantages of Present Embodiment (2-1) The outer end 230B of one flap 230 in the closed position overlaps, from the front side, the inner end 230A of another flap 230 that is adjacent to the one flap 230 on the outer side in the vehicle width direction.

This configuration achieves the above-described operation and thus blocks the inlet 21.

(2-2) The outer end 230B of one flap 230 located in the closed position is in contact with, in the front-rear direction, the inner end 230A of another flap 230 that is adjacent to the one flap 230 on the outer side in the vehicle width direction.

This configuration limits an increase in the gap between the flaps 230 located in the closed position. Accordingly, it is more difficult for the air flowing along the front surfaces of the flaps 230 to flow to the rear of the flaps 230 located in the closed position.

Modifications

The above-described embodiments may be modified as follows. The above-described embodiments and the following modifications can be combined as long as the combined modifications remain technically consistent with each other.

The following describes modifications of the first embodiment, which can also be applied to the second embodiment. That is, the following descriptions of modifications can be interpreted as configurations of the second embodiment.

The frame body 20 may include either the upper notches 22*a* or the lower notches 23*a*.

The frame body 20 does not have to include the upper notches 22*a* or the lower notches 23*a*. Even in this case, it is preferred that the front surface of each flap 30 located in the closed position be in contact with the rear surface of the frame body 20.

The front surface of each flap 30 located in the closed position does not need to be in contact with the rear surface of the frame body 20.

The flaps 30 located in the closed position may be arranged along an imaginary line that curves and extends along the front surface of the frame body 20. In this case, the body 31 of each flap 30 may have a different shape, and the support holes 51 of the link 50 do not have to be arranged linearly.

The support of the link 50 may be a support protrusion that protrudes toward each flap 30, instead of the support hole 51. In this case, each flap 30 only needs to have a hole into which the support protrusion is inserted.

The front surface of the frame body 20 may extend straight with an inclination relative to the vehicle width direction so as to extend rearward as it extends outward in the vehicle width direction.

The upper rotary shaft 33 and the lower rotary shaft 34 may be provided between one end and the other end of the body 31 in the lateral direction.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A grille shutter device configured to open or close an opening provided on a vehicle, a front side and a rear side in a front-rear direction of the vehicle being respectively referred to as a front side and a rear side, the grille shutter device comprising:

a frame body having an inlet through which air flows, the frame body defining a design surface at a front section of the vehicle; and flaps each having a rotary shaft, the rotary shaft extending in an up-down direction and being rotationally supported by the frame body, the flaps being configured to open or close the inlet by rotating in forward and reverse directions around the respective rotary shafts, wherein a front surface of a part of the frame body that surrounds the inlet extends in a direction intersecting a vehicle width direction such that the front surface extends rearward as the front surface extends outward in the vehicle width direction, and when the flaps are located in closed position to close the inlet, the flaps are arranged such that front surfaces of the flaps are arranged along the front surface of the frame body;

wherein the front surface of each of the flaps located in the closed position is in contact with a rear surface of the part of the frame body that surrounds the inlet;

wherein the rear surface of the frame body has notches, the notches respectively extending along the front surfaces of the flaps that are located in the closed position, and the front surface of each of the flaps that are located in the closed position is in contact with an inner surface of a corresponding one of the notches.

2. The grille shutter device according to claim 1, further comprising:

a link including supports, each of the supports rotationally supporting a corresponding one of the flaps, and the link coordinating rotation of the flaps, wherein the rotary shafts of the flaps are arranged on an imaginary axis, the imaginary axis extending straight such that the rotary shafts located farther outward in the vehicle width direction are located farther rearward, and the supports are arranged along the imaginary axis.

3. The grille shutter device according to claim 1, wherein each of the flaps located in the closed position includes an edge on an inner side and an edge on an outer side in the vehicle width direction that are referred to as an inner end and an outer end, respectively, and the outer end of one of the flaps in the closed position overlaps, from the front side, the inner end of an other one of the flaps that is adjacent to the one of the flaps on the outer side in the vehicle width direction.

* * * * *